United States Patent [19]
Musser

[11] 3,805,948
[45] Apr. 23, 1974

[54] CONVEYOR BELT AND FLIGHT ASSEMBLY

[76] Inventor: Malcolm E. Musser, P.O. 386, Jackson Center, Ohio 45334

[22] Filed: July 27, 1972

[21] Appl. No.: 275,537

[52] U.S. Cl. .............................................. 198/199
[51] Int. Cl. .......................................... B65g 15/42
[58] Field of Search .................................... 198/199

[56] References Cited
UNITED STATES PATENTS

| | | | |
|---|---|---|---|
| 2,540,266 | 2/1951 | Johnson | 198/199 |
| 1,405,312 | 1/1922 | Miller | 198/199 |
| 1,105,273 | 7/1914 | Howell | 198/199 |
| 1,362,651 | 12/1920 | Towns | 198/199 |

Primary Examiner—Richard E. Aegerter
Attorney, Agent, or Firm—Jacox & Meckstroth

[57] ABSTRACT

An endless conveyor belt has longitudinally spaced flights each formed by folding the belt to produce a loop portion, extending the loop portion through a slot defined by an elongated link-shaped retainer and then inserting a core member into the loop portion. A set of longitudinally extending parallel slits are formed within each loop portion of the belt for receiving the U-shaped end portions of the retainer, and preferably the core member is formed by a wood slat having notches for receiving the end portions of the retainer. The overall length of the retainer and the core member are generally the same as the width of the belt.

5 Claims, 5 Drawing Figures

PATENTED APR 23 1974 3,805,948

CONVEYOR BELT AND FLIGHT ASSEMBLY

BACKGROUND OF THE INVENTION

In the art of endless belt conveyors, it is common to provide longitudinally spaced slots or flights along the length of the conveyor belt to provide a positive engagement between the belt and the articles or material to be transported. Frequently, the flights are formed by securing elongated right angle brackets or slats to the conveyor belt by means of suitable fasteners such as bolts or rivets. It is also known to construct each flight by looping the belt around a rigid bar or slat. For example, U.S. Pat. Nos. 435,623, 838,221, 1,015,558, and 1,362,651, each show a conveyor belt having flights constructed in this manner. In the first two patents, the conveyor belt is looped around the slat and is secured to the slat by a metal cover and a series of laterally spaced bolts or rivets. In each of the latter two patents, each loop portion of the conveyor belt is secured to a cylindrical slat or rod by a laterally extending elongated spring metal clamp.

It has been found desirable to avoid the use of laterally spaced fasteners such as bolts and rivets to secure a slat to a conveyor belt, especially when the conveyor is used for transporting relatively heavy articles or material. That is, each hole which is formed within the conveyor belt for receiving a fastener, weakens the belt and thereby increases the chances of the belt tearing at one of the holes or one of the fasteners pulling through a hole. When a spring metal clamp is used without a series of fasteners, it is necessary for the clamp to be of relatively heavy rugged construction so that the clamp does not open when the belt is tensioned. Such clamps add significantly to the construction cost and weight of the belt conveyor.

It has also been proposed to join or connect the ends of a belt conveyor with the use of a pair of opposing clamp members which clamp the end portions of the belt together and are secured by a surrounding link formed from a metal rod. This structure is disclosed in U.S. Pat. No. 501,266 and may be used to form a flight on the conveyor belt. It is also frequently desirable for each conveyor flight to have a resilient outer surface for cushioning articles which are dropped onto the conveyor belt for transport. This feature is especially important when the articles are easily damaged and/or the conveyor belt is operated at a relatively high speed.

SUMMARY OF THE INVENTION

The present invention is directed to a conveyor belt having a series of improved laterally extending flights spaced at longitudinal intervals along the belt. The invention provides a belt and flight assembly of simplified and economical construction and which minimizes the possibility of tearing of the belt when the belt is tensioned in a longitudinal direction. The belt and flight assembly of the invention also provides a resilient outer surface for each flight to cushion the impact of articles dropped onto the belt for transport.

In accordance with the preferred embodiment of the invention, an endless flexible belt has a series of longitudinally spaced flights, each of which is formed by folding the belt to produce an outwardly projecting loop portion. A pair of laterally spaced and longitudinally extending slits are formed within each loop portion, and the center section of the loop portion is extended through a slot defined by an elongated continuous link-shaped retainer. The U-shaped end portions of the retainer project through the slits, and an elongated wood slat of generally square cross-section is extended through the loop portion above the retainer. The slat has a width substantially greater than the width of the slot within the retainer, so that the center section of the loop portion and the slat are drawn firmly against the retainer when the belt is tensioned in a longitudinal direction.

Other features and advantages of the invention will be apparent from the following description, the accompanying drawing and the appended claims.

DESCRIPTION OF THE PREFERRED EMBODIMENT

Figure 1:
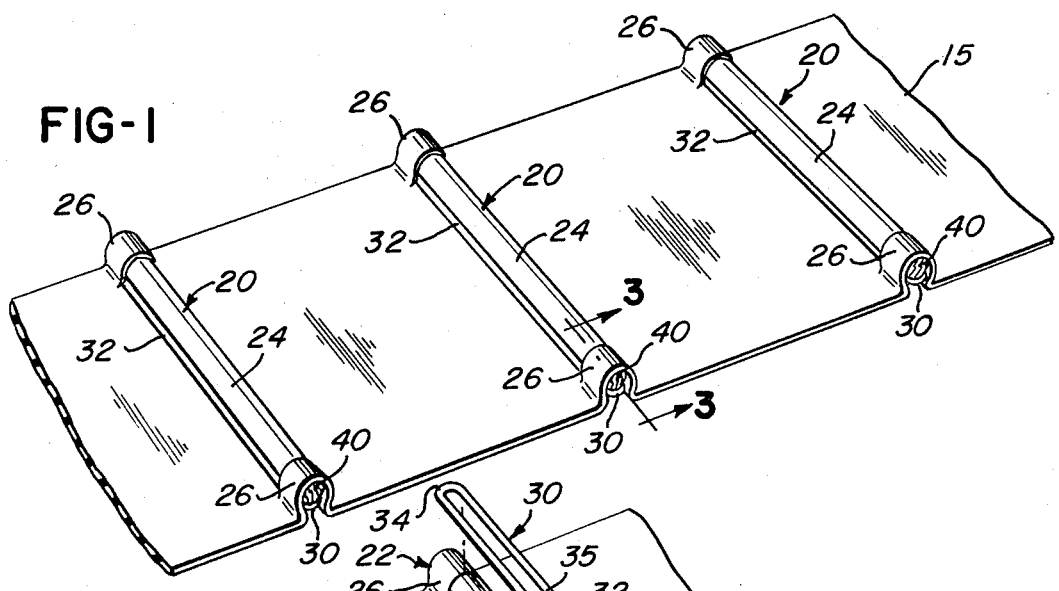
FIG. 1 is a fragmentary perspective view of a conveyor belt and flight assembly constructed in accordance with the present invention.
Figure 2:
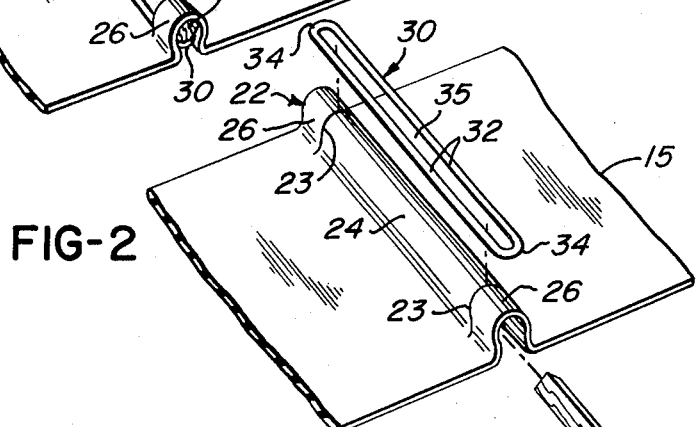
FIG. 2 is an exploded perspective view of a portion of the assembly shown in FIG. 1.

The conveyor belt and flight assembly illustrated in FIG. 1 includes an elongated endless flexible belt 15 which is constructed from a fabric reinforced rubber sheeting material, but which may be constructed of other materials such as canvas, leather or synthetic plastics material. The belt is provided with a series of longitudinally spaced flights 20 which extend laterally across the belt to provide for engaging the articles or material to be transported and to prevent the belt from sliding under the articles or material.

Each of the flights 20 is formed by folding the belt 15 to form an inverted generally U-shaped loop portion 22. A pair of parallel spaced slits 23 are formed within the loop portion 22 and extend longitudinally of the belt 15. The slits 23 are spaced somewhat inwardly from the corresponding edges of the belt 15 to form an intermediate or center section 24 located between opposite end sections 26.

an elongated retaining member 30 consists of a metal rod which is formed into a continuous link having parallel spaced rod portions 32 integrally connected by U-shaped end portions 34. The formed metal rod or link defines a slot 35, and the center section 24 of the belt loop portion 22 extends through the slot 35. The end portions 34 of the retaining member 30 project into the corresponding end sections 26 of the belt loop portion 22.

Figure 3:
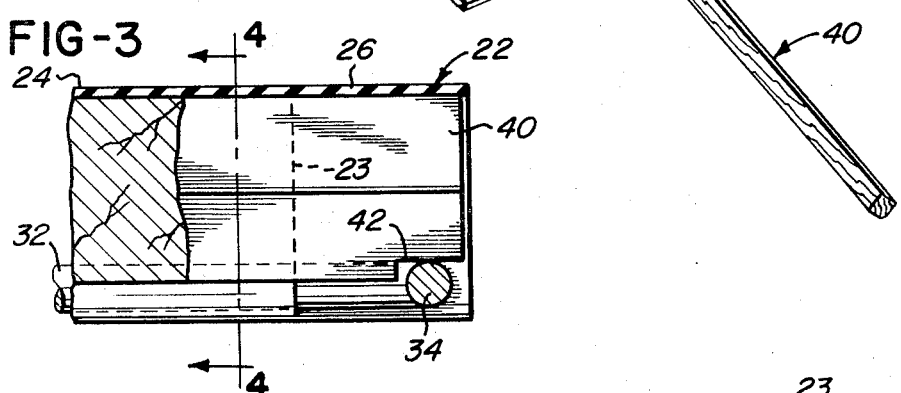
FIG. 3 is an enlarged fragmentary section taken generally on the line 3—3 of FIG. 1.
Figure 4:
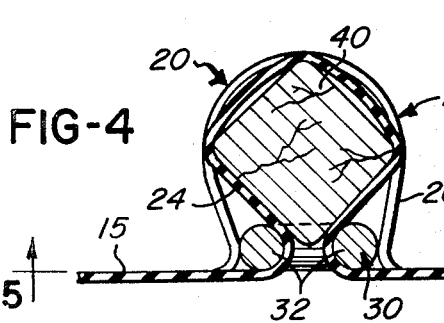
FIG. 4 is an enlarged fragmentary section taken generally on the line 4—4 of FIG. 3.
Figure 5:
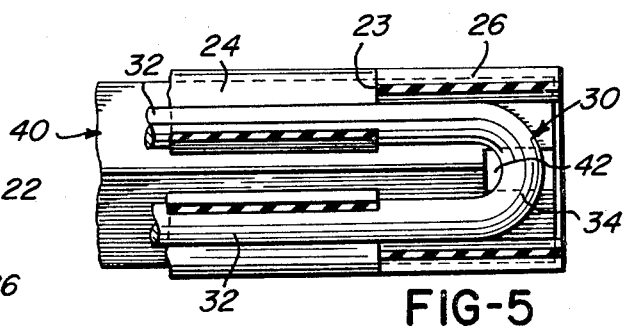
FIG. 5 is an enlarged fragmentary section taken generally on the line 5—5 of FIG. 4.

An elongated rigid core member or slat 40 extends through each loop portion 22 of the belt 15 and preferably is formed of a wood strip having a generally square cross-sectional configuration. As shown in FIGS. 3–5, the slat 40 is orientated so that a corner portion of the slat projects into the slot 35 between the parallel rod portions 32, and each end portion of the slat 40 is formed with a notch or recess 42 which receives the corresponding end portion 34 of the link member 30. Thus when the belt 15 is tensioned in a longitudinal direction, the center section 24 of the loop portion 22, is pulled or drawn tightly around the slat 40 as shown in FIG. 4 to assure that the slat 40 does not shift longitudinally within the loop portion 22. The recesses within the slat 40 also cooperate with the end portions 34 of the retainer 30 to assure positive positioning of the slat 40 within the loop portion 22. As is apparent from FIG. 3, the retaining member 30 and the slat 40 have substantially the same length which is substantially equal to the width of the belt 15.

Each of the flights 20 is formed by first cutting the slits 23 within the belt 15 and then folding the belt to form the loop portion 22. The center section 24 of the loop portion is inserted into the slot 35 of the retainer 30, and the end portions 34 of the retainer 30 are inserted through the corresponding slits 23 and into the corresponding end sections 26 of the loop portion 22. The slat 40 is then inserted into the loop portion 22 until the recesses 42 within the end portions of the slat 40 receive the corresponding end portions 34 of the retainer 30. The belt 15 is then tensioned in a longitudinal direction so that the center section 24 of the loop portion 22 is pulled tightly around the slat 40 (FIG. 4), and the slat 40 is drawn downwardly into firm seating relation within the slot 35.

From the drawing and the above description, it is apparent that an endless conveyor belt incorporating flights constructed in accordance with the present invention, provides desirable features and advantages. For example, the construction of each of the flights 20 provides for a simplified and economical conveyor belt and flight assembly. In addition, the flights 20 are rugged and durable so that they will provide many years of service without maintenance. The longitudinal tension within the belt 15 is transferred through each of the flights 20 by the center sections 24 of the loop portions 22 so that each slat 40 is positively secured to the belt 15 by the retaining member 30. Since the slits 23 extend longitudinally of the belt 15, longitudinal tension within the belt 15 does not produce concentrated stresses within the belt 15 at the slits 23, and thus the possibility of the belt 15 tearing at the slits 23 is avoided.

Another desirable feature is provided by the fact that each of the flights 20 extends the full width of the belt 15, but the end portions of the retaining member 30 and the core member or slat 40 do not project beyond the corresponding edges of the belt 15. This construction is frequently desirable for minimizing wear of the stationary side rails which extend adjacent the edges of the belt 15 to guide the belt. Furthermore, since the loop portions 22 of the belt 15 form the outer surfaces for the flights 20, the belt material forms a resilient or cushioned surface for receiving the articles. Such a surface is frequently desirable when the articles to be transported are dropped onto the conveyor and if there is a likelihood that the articles could be damaged by a flight having a hard outer surface. A further advantage is provided by the use of the core member or slat 40 for each flight 20. The square slat 40 positively nests or seats into the corresponding retainer 30 when the belt 15 is tensioned in a longitudinal direction as shown in FIG. 4.

While the form of conveyor belt and flight assembly herein described constitutes a preferred embodiment of the invention, it is to be understood that the invention is not limited to this precise form of assembly and that changes may be made therein without departing from the scope and spirit of the invention. For example, it is apparent that notches could be formed within the edges of the belt 15 adjacent the ends of each loop portion 22 for receiving the corresponding end portions of the retaining member 30. However, the longitudinally extending slits 23 have been found preferable in that the slits substantially eliminate the formation of any concentrated stresses within the belt 15, whereas notches within the edges of the belt 15 could result in concentrated stresses and thereby increase the chances of tearing the belt 15. It is also apparent that the retaining member 30 may be constructed from flat bar stock with a longitudinally extending slot. However, the round or curved outer surface of the rod-type retaining member 30 is desirable for minimizing the formation of concentrated stresses within the belt 15 when the belt is tensioned.

The invention having thus been described, the following is claimed:

1. A conveyor belt and flight assembly comprising an elongated flexible belt, an elongated rigid retaining member extending laterally across said belt and having generally U-shaped opposite end portions and a longitudinally extending slot, said belt including a laterally extending loop portion having laterally spaced longitudinally extending slits defining a center section between opposite end sections, said center section of said loop portion extending through said slot within said retaining member, said end portions of said retaining member projecting through said slits and into said end sections of said loop portion, and an elongated rigid slat extending through said loop portion of said belt and having a width greater than the width of said slot to effect tightening of said center section of said loop portion around said slat when said belt is tensioned in a longitudinal direction.

2. A conveyor belt and flight assembly comprising an elongate flexible belt, an elongate rigid retaining member extending laterally across said belt and having a longitudinally extending slot, said belt having a loop portion projecting through said slot, an elongate core member disposed within said loop portion of said belt, said core member and said retaining member each having a length no greater than the width of said belt, said retaining member having generally U-shaped end portions, said belt having a set of laterally spaced longitudinally extending slits for receiving said end portions of said retaining member.

3. A conveyor belt and flight assembly comprising an elongated flexible belt, an elongated generally flat retaining member extending laterally across said belt and including parallel spaced bar portions rigidly connected at opposite corresponding ends for defining a slot therebetween, said belt having a loop portion projecting upwardly through said slot substantially above said retaining member, a core member extending within said loop portion, the combined width of said core member and said loop portion of said belt in the longitudinal direction of said belt being substantially greater than the width of said slot in the same direction to effect tightening of said loop portion around said core member and pulling of said core member downwardly against said retaining member in response to tensioning of said belt, and the outer surface of said loop portion of said belt forming an upwardly projecting flight surface extending laterally across said belt, said loop portion of said belt having a plurality of laterally spaced slits extending longitudinally of said belt, and said retaining member having corresponding end portions projecting through said slits.

4. A conveyor belt and flight assembly comprising an elongated flexible belt, an elongated generally flat retaining member extending laterally across said belt and including parallel spaced bar portions rigidly connected at opposite corresponding ends for defining a slot therebetween, said belt having a loop portion projecting upwardly through said slot substantially above said retaining member, a core member extending within said loop portion, the combined width of said core member and said loop portion of said belt in the longitudinal direction of said belt being substantially greater than the width of said slot in the same direction to effect tightening of said loop portion around said core member and pulling of said core member downwardly against said retaining member in response to tensioning of said belt, and the outer surface of said loop portion of said belt forming an upwardly projecting flight surface extending laterally across said belt, said loop portion of said belt having a plurality of laterally spaced slits extending longitudinally of said belt, said retaining member having corresponding end portions projecting through said slits, and said core member having recesses receiving said end portion of said retaining member.

5. A method of forming a flight on an endless conveyor belt, comprising the steps of forming a laterally extending loop portion within the belt, extending the loop portion upwardly through a slot within an elongated generally flat annular retaining member to position the loop portion substantially above the retaining member, and inserting a core member which is substantially larger than the retaining member into the loop portion of the belt to effect tightening of the loop portion around the core member when the belt is tensioned in a longitudinal direction and to cause the loop portion of the belt to form a flight surface extending laterally across the belt, and including the step of forming a set of longitudinally extending slits within said loop portion of said belt in laterally spaced parallel relation, and extending the end portions of said retaining member through said slits for locating the center portion of said retaining member outboard of said loop portion and said end portions of said retaining member within said loop portion.

* * * * *